US011142046B2

United States Patent
Catuzza

(10) Patent No.: US 11,142,046 B2
(45) Date of Patent: Oct. 12, 2021

(54) VEHICLE SIDE-WINDOW SUN SHIELD

(71) Applicant: Scott Catuzza, Tonawanda, NY (US)

(72) Inventor: Scott Catuzza, Tonawanda, NY (US)

(*) Notice: Subject to any disclaimer, the term of this patent is extended or adjusted under 35 U.S.C. 154(b) by 90 days.

(21) Appl. No.: 16/818,121

(22) Filed: Mar. 13, 2020

(65) Prior Publication Data
US 2021/0283996 A1   Sep. 16, 2021

(51) Int. Cl.
*B60J 3/02* (2006.01)

(52) U.S. Cl.
CPC ............. *B60J 3/0278* (2013.01); *B60J 3/02* (2013.01); *B60J 3/0286* (2013.01)

(58) Field of Classification Search
USPC ........................................................ 296/152
See application file for complete search history.

(56) References Cited

U.S. PATENT DOCUMENTS

| | | | |
|---|---|---|---|
| 5,033,786 A * | 7/1991 | Bickford | B60J 3/02 296/97.9 |
| 5,899,520 A | 5/1999 | Bryant | |
| 6,394,530 B1 * | 5/2002 | Bittner | B60J 1/2011 160/370.21 |
| 9,266,410 B2 * | 2/2016 | Guina | B60J 3/02 |
| 2012/0098291 A1 | 4/2012 | Wilson | |

* cited by examiner

*Primary Examiner* — Joseph D. Pape
(74) *Attorney, Agent, or Firm* — Vincent G. LoTempio

(57) ABSTRACT

A vehicle side-window sun shield detachably mounts to a vehicle side-window to block sunlight from the outer arm of the driver or passenger in a vehicle. The sun shield includes a flat lower portion panel having two legs that fit into the slot between the window and rubber strip along window. The sun shield also includes a flat upper portion panel integrally formed with the lower portion panel. Upper portion panel is disposed at an angle of at least 45° relative to the lower portion panel to shade the outer arm from the ultra violet light of the sun. The upper portion panel extends towards the interior of the vehicle above the driver or passenger arm to block sunlight. The upper portion panel may extend out 5¼" over the arm of the driver. A film overlays the panels to block the ultraviolet light of sun.

20 Claims, 8 Drawing Sheets

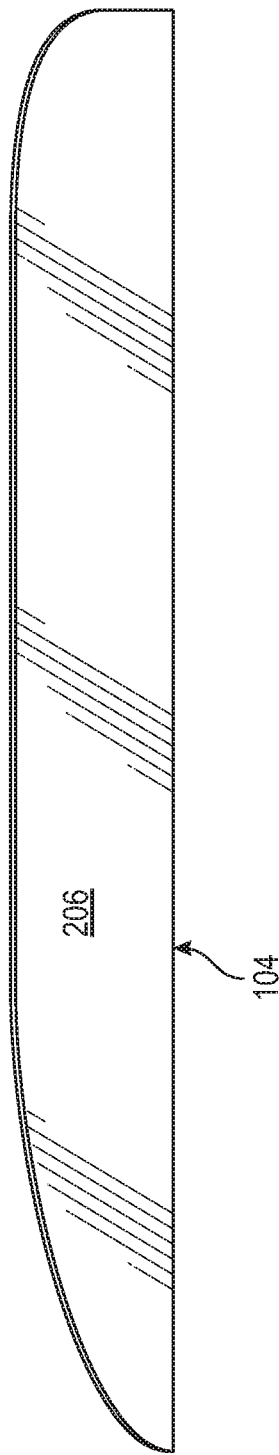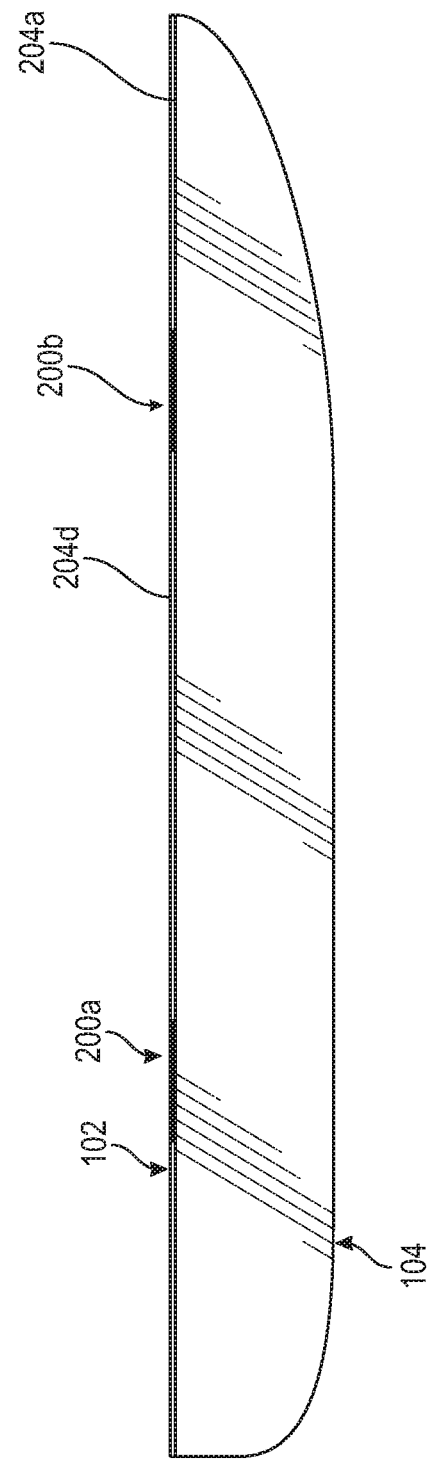
FIG. 5
FIG. 6

VEHICLE SIDE-WINDOW SUN SHIELD

FIELD OF THE INVENTION

The present invention relates generally to a vehicle side-window sun shield. More so, the present invention relates to a sun shield that affixes to a vehicle side-window to block sunlight from the outer arm of the driver or passenger; whereby the sun shield includes a flat lower portion panel having two legs that fit into the slot between the window and the rubber seal of the window, and a flat upper portion panel integrally formed with the lower portion panel at an angle of at least 45° relative to the lower portion panel, such that the upper portion panel extends towards the interior of the vehicle, shading the outer arm of the driver or passenger to block ultra violet light from the sun.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, a vehicle sun shade mounts to at least one window of a vehicle to block the ultra violet light from the sun form the interior of the vehicle. Vehicle sun shades are effective in minimizing heat buildup within a parked automobile or other vehicle during daylight hours. Sun shades are also useful in protecting a vehicle's interior from radiation damage.

Cardboard that is cut out to the shape of a vehicle window is often used for shading against the sun. However, in other configurations, the vehicle sun shade is flexible, having a cloth-like material and which can be fastened in close proximity to the inside of the vehicle windows. This has advantages over cardboard and other rigid and semi-rigid sun shades that they are easier to store when not in use and, if sized properly for all windows, the more flexible configurations of sun shades can block a substantial amount of the ultra violet light from the interior of the vehicle.

Other proposals have involved vehicle sun shades that mount to various windows and vehicle structures. The problem with these sun shade devices is that they do not easily mount to a driver's side window to protect the forearm of the driver from ultra violet light from the sun. Even though the above cited gripping devices meets some of the needs of the market, a vehicle side-window sun shield that detachably mounts to a vehicle side-window to block sunlight from the outer arm of the driver or passenger; whereby the sun shield includes a flat lower portion panel having two legs that fit into the slot between the window and the rubber seal of the window, and a flat upper portion panel integrally formed with the lower portion panel at an angle of at least 45° relative to the lower portion panel, such that the upper portion panel extends towards the interior of the vehicle, shading the outer arm of the driver or passenger to block ultra violet light from the sun, is still desired.

SUMMARY

Illustrative embodiments of the disclosure are generally directed to a vehicle side-window sun shield. The sun shield that detachably mounts to a vehicle side-window to block sunlight from the outer arm of the driver or passenger in a vehicle. The sun shield includes a flat lower portion panel having two legs that fit into the slot between the window and the rubber strip of the window. The sun shield also includes a flat upper portion panel integrally formed with the lower portion panel. The upper portion panel is disposed at an angle of at least 45° relative to the lower portion panel, so as to shade the outer arm of the driver or passenger. The upper portion panel extends towards the interior of the vehicle above the driver or passenger arm to block the sunlight. The lower portion panel may be 24" long, and the upper portion panel may extend out 5¼" over the arm of the driver or passenger. A film overlays the panels to substantially block the ultraviolet light of the sun.

In one non-limiting embodiment, a vehicle side-window sun shield, comprises:
  a lower portion panel defined by a lower edge, an upper edge, and a pair of lateral edges;
  one or more legs integrally joined with the lower edge of the lower portion panel, the legs terminating at a flat, tapered edge; and
  an upper portion panel integrally joined with the upper edge of the lower portion panel, the upper portion panel projecting at an angle relative to the lower portion panel.

In another aspect, the lower portion panel is flat.

In another aspect, the lower portion panel is defined by a rectangular shape.

In another aspect, the lower portion panel is about 24" long.

In another aspect, the one or more legs comprise two legs.

In another aspect, the legs are defined by a rectangular shape.

In another aspect, the legs are smaller than the lower portion panel and the upper portion panel.

In another aspect, the legs are sized and dimensioned to fit into the slot between a vehicle side-window and a rubber strip.

In another aspect, the side-window is a driver's side-window.

In another aspect, the upper portion panel is flat.

In another aspect, the upper portion panel is defined by a rectangular shape.

In another aspect, the upper portion panel is about 24" long.

In another aspect, the upper portion panel is about 5¼" wide.

In another aspect, the upper portion panel projects at an angle of at least 45° relative to the lower portion panel.

In another aspect, the sun shield further comprises a film configured to block at least 50% of the ultra violet light of the sun.

In another aspect, the film is translucent.

In another aspect, the film overlays the lower portion panel and the upper portion panel.

One objective of the present invention is to block sunlight from the outer arm of the driver or passenger.

Another objective is to fit the sun shield between the window and the rubber strip, such that the sun shield remains upright.

Yet another objective is to angle the upper portion panel, such that the driver's arm is substantially protected from the UV light of the sun.

Another objective is to minimize heat buildup within a parked vehicle during daylight hours, and protect a vehicle's interior from radiation damage.

An exemplary objective is to provide an inexpensive to manufacture vehicle side-window sun shield.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which:

FIG. 5 illustrates a top view of the vehicle side-window sun shield shown in FIG. 1, in accordance with an embodiment of the present invention;

FIG. 6 illustrates a bottom view of the vehicle side-window sun shield shown in FIG. 1, in accordance with an embodiment of the present invention;

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
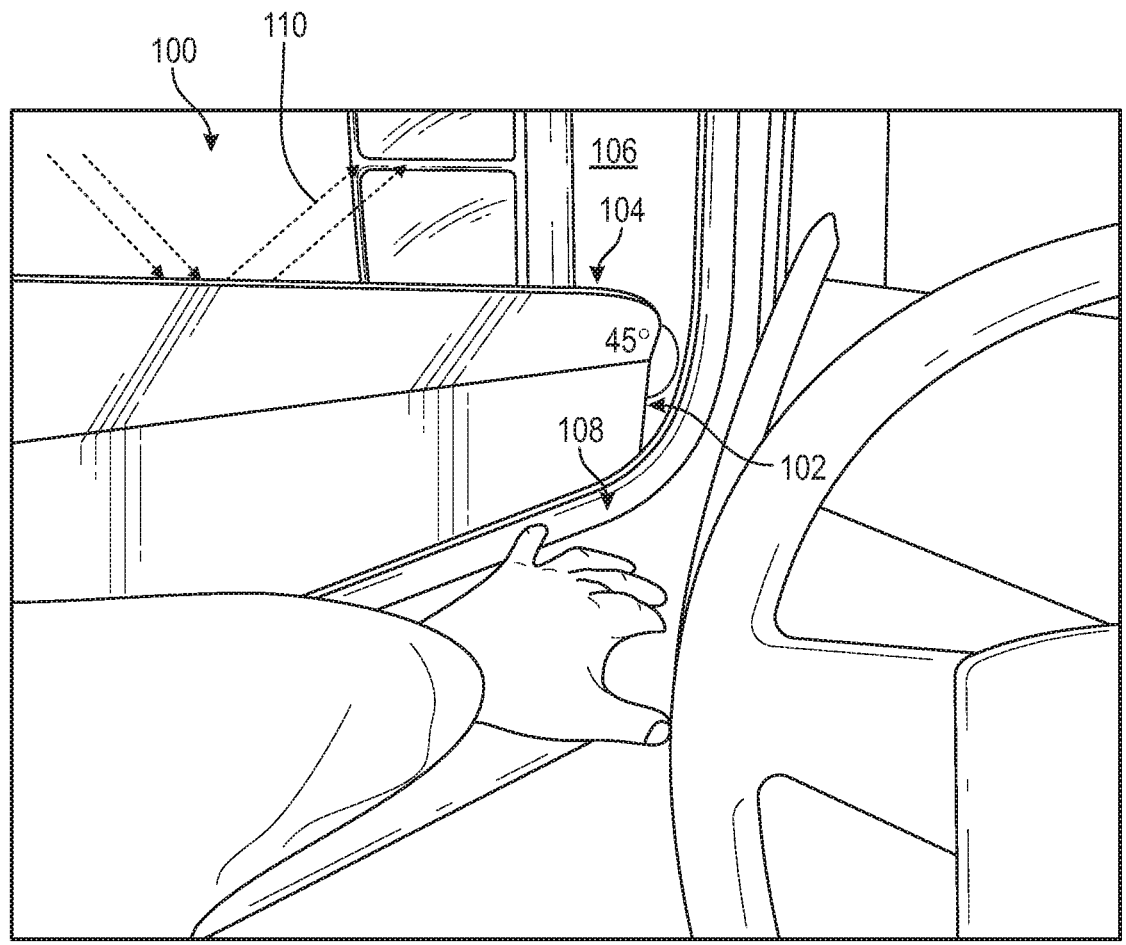
FIG. 1 illustrates a perspective view of an exemplary vehicle side-window sun shield mounted to a side-window of a vehicle, and the outer arm of driver being shaded from ultra violet light of the sun, in accordance with an embodiment of the present invention.

A vehicle side-window sun shield 100 is referenced in FIGS. 1-9. The vehicle side-window sun shield 100, hereafter "sun shield 100" is a uniquely shaped and dimensioned assemblage of panels that substantially block the ultra violet light 110 of the sun while fitted between a vehicle side-window and a rubber strip 108. Sun shield 100 serves to block sunlight from striking the outer arm of the driver or passenger of a vehicle. For example, FIG. 1 illustrates a perspective view of an exemplary vehicle side-window sun shield mounted to a side-window of a vehicle, and the outer arm of driver being shaded from ultra violet light of the sun. To achieve this, sun shield 100 has a lower portion panel 102 for mounting into the side-window, and an upper portion panel 104 projecting at an angle towards the driver or passenger to cover the outer arm, and thereby block the ultra violet light 110 from the sun.

Figure 2:
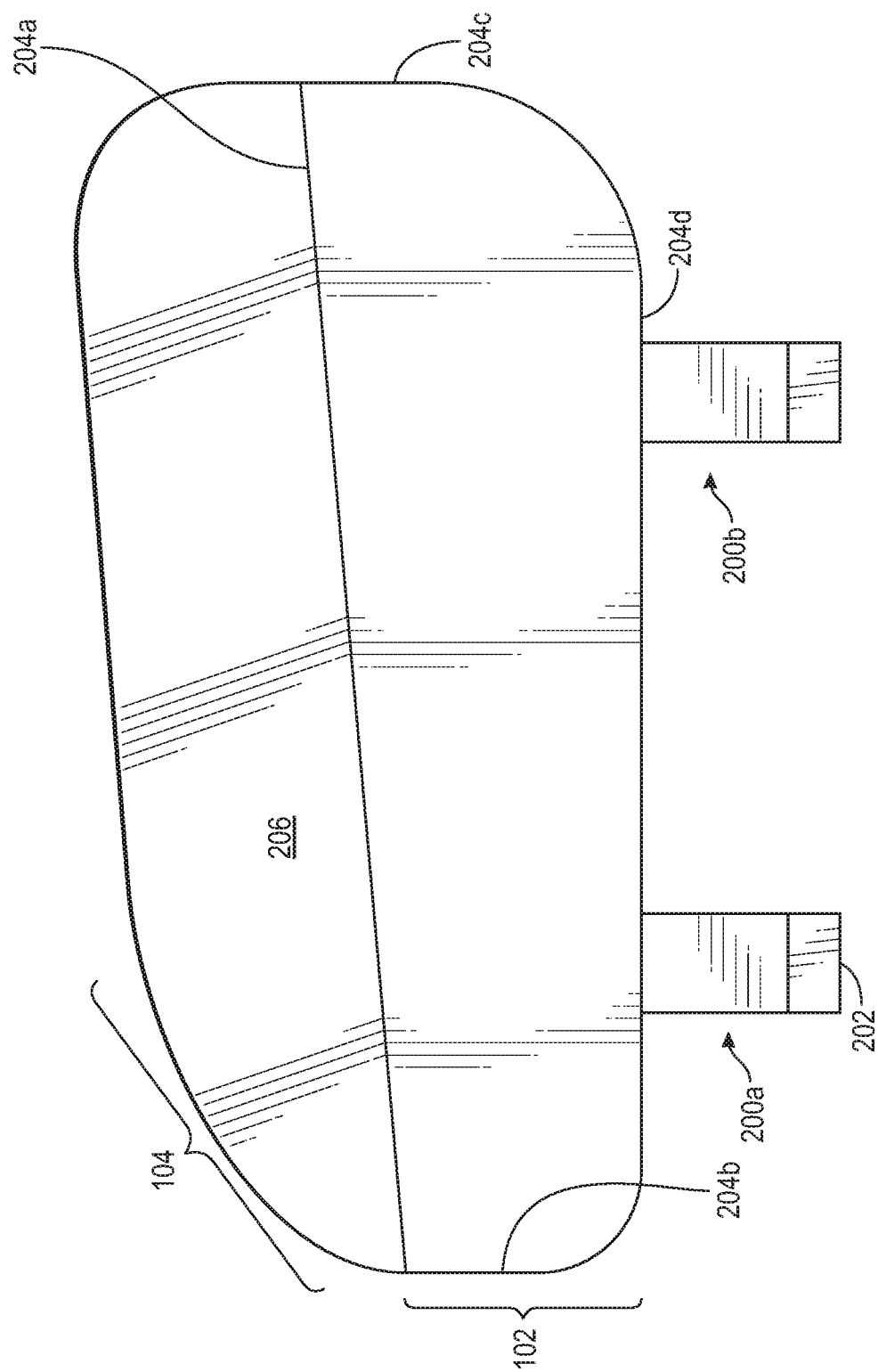
FIG. 2 illustrates a front perspective view of a vehicle side-window sun shield, in accordance with an embodiment of the present invention.
Figure 3:
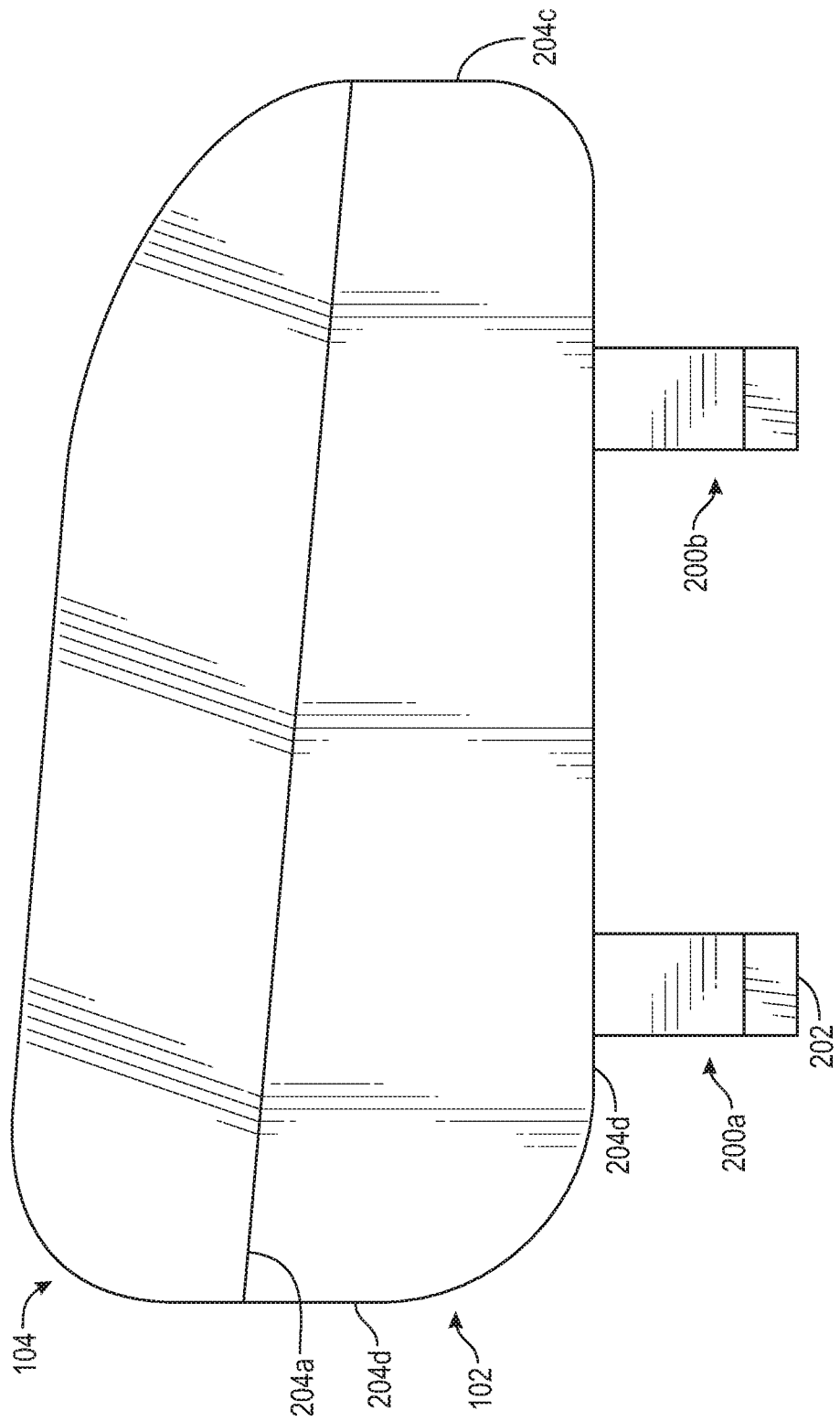
FIG. 3 illustrates a rear perspective view of the vehicle side-window sun shield shown in FIG. 1, in accordance with an embodiment of the present invention.

As FIG. 2 references, sun shield 100 comprises a lower portion panel 102 that is defined by an upper edge 204a, a lower edge 204d, and a pair of lateral edges 204b, 204c. Upper and lower edges 204a, 204d are parallel. Similarly, the two lateral edges 204b-c are parallel. In one non-limiting embodiment, edges 204a-d form a rectangular shape. Lower portion panel 102 is defined by a flat shape that extends along the length of the side-window 106 of the vehicle. In one non-limiting embodiment shown in FIG. 3, the lower portion panel 102 is about 24" long. Lower portion panel 102 is disposed proximal to a door edge that supports the up-and-down operation of vehicle side-window 106. In one embodiment, side-window 106 is a driver's side-window for a semi-truck. However, any vehicle, and any side-window thereof may be operable with sun shield 100.

Figure 4:
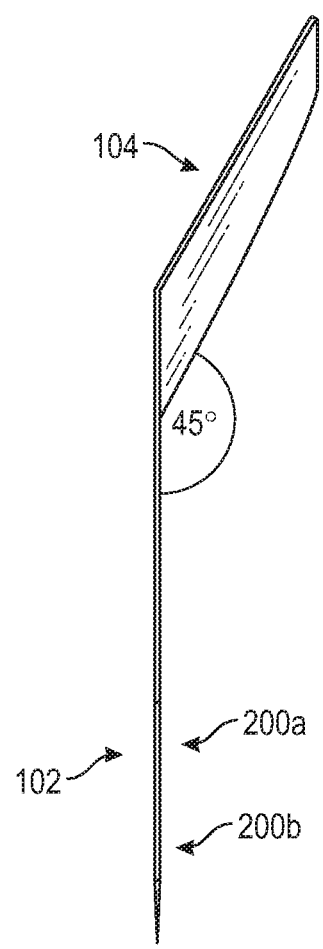
FIG. 4 illustrates an elevated side view of the vehicle side-window sun shield shown in FIG. 1, in accordance with an embodiment of the present invention.

In order to securely (and detachably) mount lower portion panel 102 to the side-window 106, the sun shield 100 utilizes one or more legs 200a-b that are integrally joined with the lower edge 204d of lower portion panel 102 (See FIG. 4). Legs 200a, 200b are configured in an elongated, flat, rectangular shape. As illustrated, the legs 200a-b are smaller than lower portion panel 102 and upper portion panel 104. This is because legs 200a-b are designed for mounting purposes, and not to shade the outer arm of driver or passenger. In one non-limiting embodiment, two legs 200a, 200b are utilized. However, in other embodiments, more than two legs may be used.

In some embodiments, legs 200a-b terminate at a tapered edge 202 having a sharp terminal surface. Tapered edge 202 is adapted to fit into the slot between a vehicle side-window 106 and a rubber strip 108. In this manner, sun shield 100 detachably mounts to a driver's side-window to protect the driver's outer arm from ultra violet light from the sun. However, in alternative embodiments, the legs can also mount on the passenger side-windows for substantially the same purpose. However, this configuration requires upper portion panel 104 to project in an opposing direction.

Figure 7:
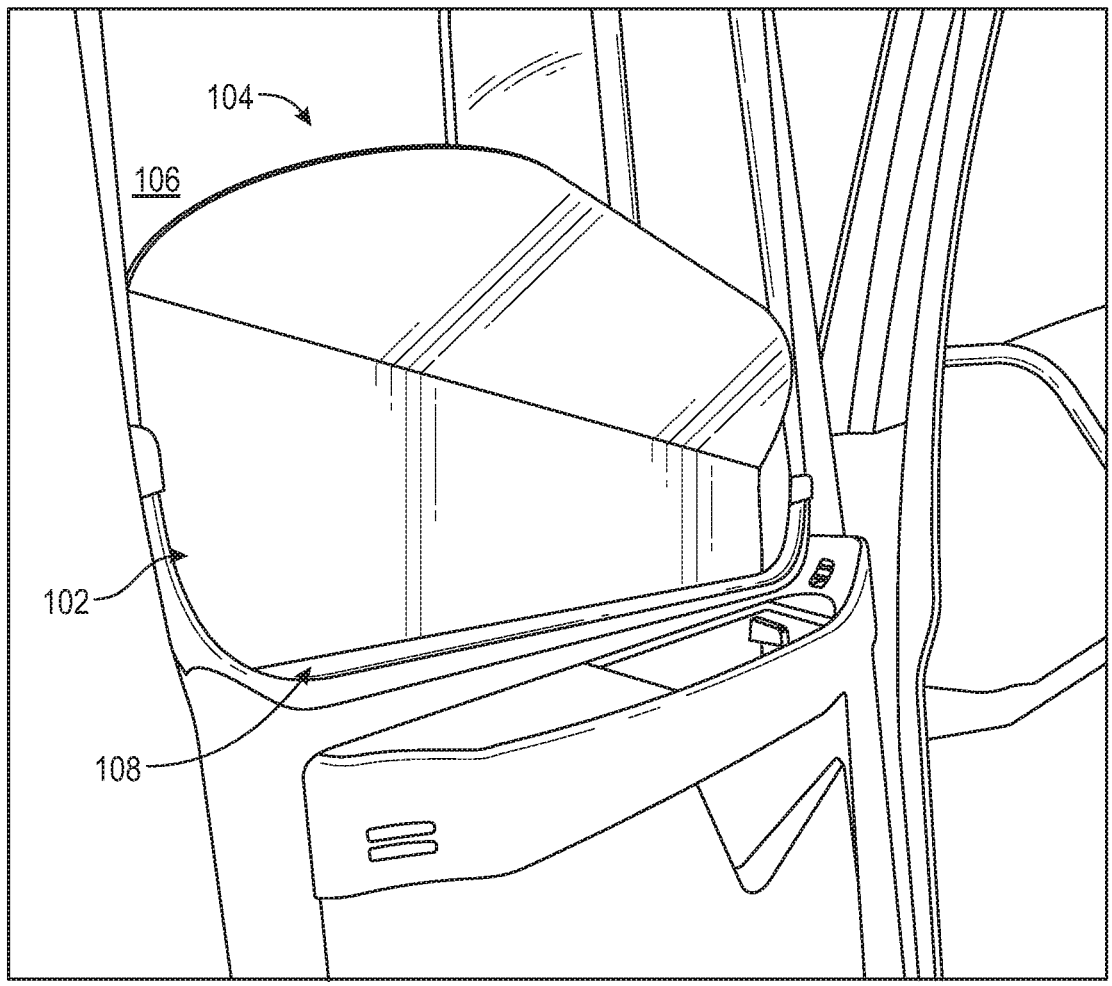
FIG. 7 illustrates an interior perspective view of the vehicle side-window sun shield mounted to the side-window, in accordance with an embodiment of the present invention.

In this manner, legs 200a-b can be pressed into gap between side-window 106 and rubber strip or door structure in vehicle. In one exemplary mounting configuration shown in FIG. 5, the side-window 106 into which the legs 200a-b are fitted, is a driver's side-window 106. This can include a driver of a truck, or semi-truck. Legs 200a-b are pressed into space between side-window 106 and rubber strip 108 at upper edge of the vehicle door structure. FIG. 7 shows an interior view of sun shield 100 mounted to side-window 106, such that the outer arm of a truck driver is substantially shielded from ultra violet light 110 of sun. In this mounted configuration, upper portion panel 104 is oriented to at least partially wrap around the outer forearm of driver, so as to provide ultra violet light protection thereto.

Figure 9:
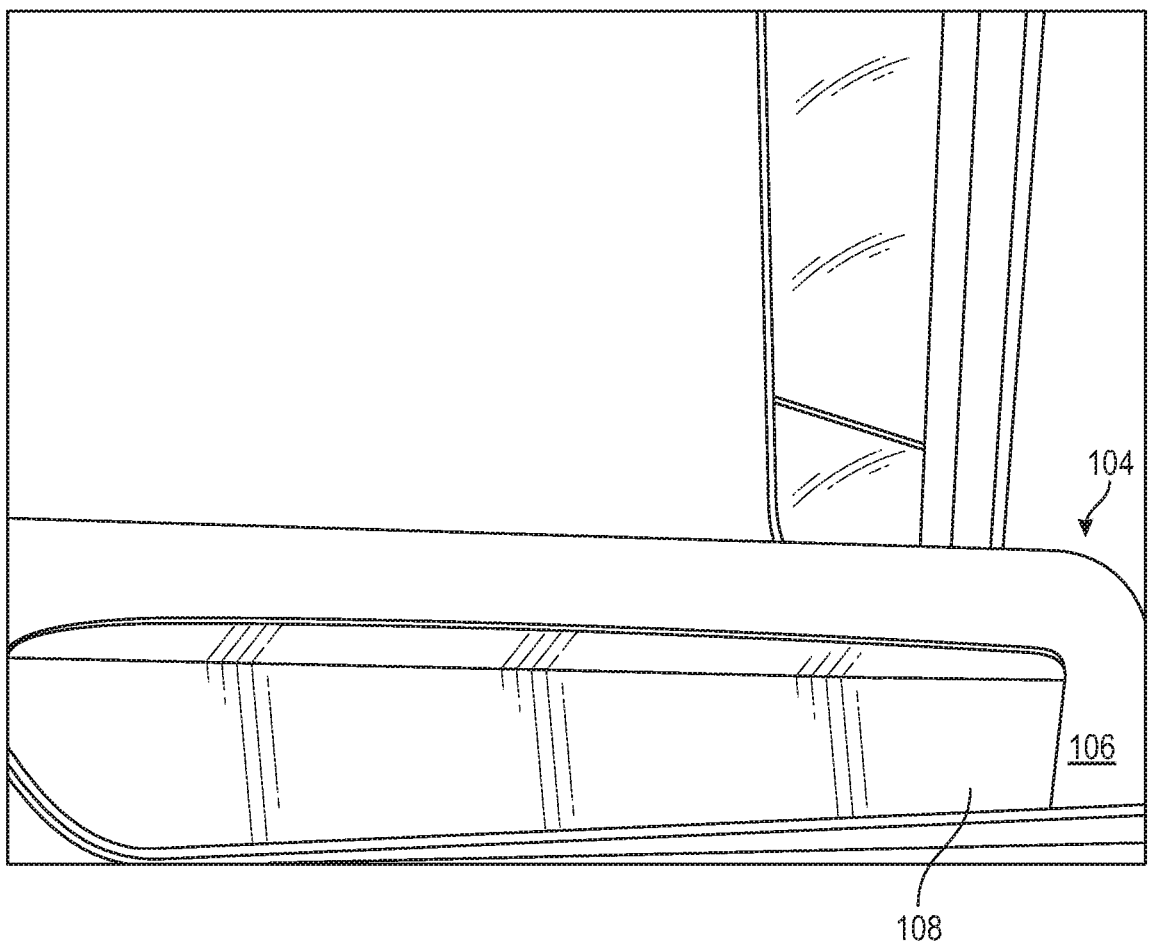
FIG. 9 illustrates an interior perspective view of the vehicle side-window sun shield mounted to the side-window with the side-window retracted into the body structure of the vehicle door, in accordance with an embodiment of the present invention.

Looking now at FIG. 6, sun shield 100 comprises an upper portion panel 104 that is integrally joined with the upper edge 204a of the lower portion panel 102. Upper portion panel 104 is the portion of the sun shield 100 that covers the outer arm of the driver or passenger, depending on which side-window 106 receives the sun shield 100. In one non-limiting embodiment, upper portion panel 104 is about 24" long. Upper portion panel 104 may also be constructed along the length of the side-window 106. As illustrated in FIG. 9, upper portion panel 104 extends above side-window 106, when side-window 106 retracts into door structure. Lower portion panel 102 is not visible in this configuration, having been pulled into door structure with side-window 106.

In another non-limiting embodiment, upper portion panel 104 is about 5¼" wide. These panel dimensions provide sufficient surface area to form a protective cover to the outer arm of the driver, or passenger. Upper portion panel 104 projecting at an angle relative to the lower portion panel 102. In some embodiments, upper portion panel 104 projects at an angle of at least 45° relative to the lower portion panel 102. However, in other embodiments, upper portion panel 104 projects at an angle greater than 45°. However, upper portion panel may be configured, such that additional angles are formed to accommodate different side-window structures and driver arm sizes. In any case, upper portion panel 104 projects inwardly to the vehicle at an angle, such that the driver or passenger arm is substantially protected from the ultra violet light 110 of the sun.

In some embodiments, lower and upper portion panels 102, 104 may be fabricated, without limitation, from polyurethane, polyethylene, a vinyl-coated polyester, or other polymers known in the art of sun shades. The unique fabric material of panels 102, 104 inhibits the panels from melting in the range of 200°-300° Fahrenheit. This protection against high temperatures inside the vehicle achieve one of the objectives of the sun shield 100, which is to objective is to minimize heat buildup within a parked vehicle during daylight hours, and protect a vehicle's interior from radiation damage. Furthermore, the lower and upper portion panels 102, 104 may be fabricated as separate components that are mechanically joined at their edges through welding, adhesives, bolts, and other fastening means known in the art of sun shades. However, in other embodiments, the lower and upper portion panels 102, 104 are molded from a single polymer component, and integrally joined.

Looking back at FIG. 2, lower and upper portion panels 102, 104 of sun shield 100 may also include a resilient film 206 that is configured to block at least 50% of the ultra violet light 110 of the sun. Film 206 is translucent, so as to substantially block the ultra violet light 110 from the sun. In some embodiments, film 206 overlays upper portion panel 104, providing protection against ultra violet light 110. However, in other embodiments, film 206 overlays lower portion panel 102 and legs 200a-b. An adhesive may be used to securely mount film 206 on panels. In some embodiments, film 206 may be specially treated to create a partially opaque configuration that blocks sunlight.

Figure 8:
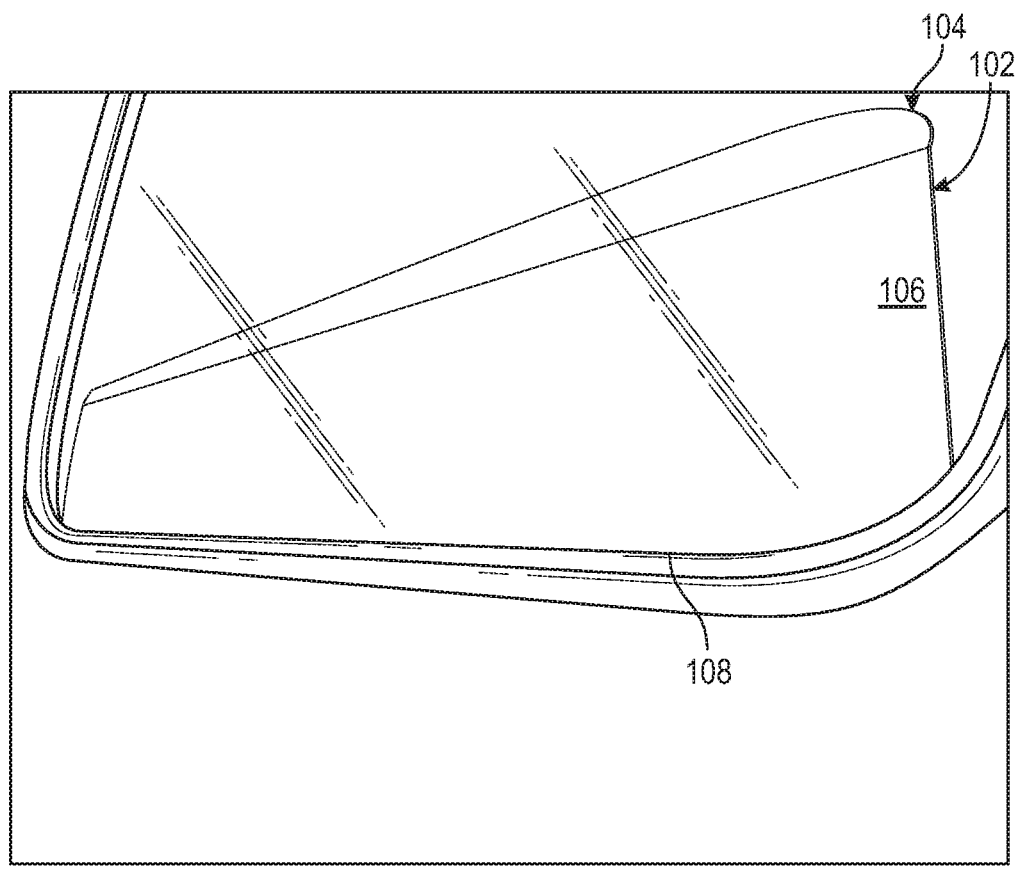
FIG. 8 illustrates an exterior perspective view of the vehicle side-window sun shield mounted to the side-window, in accordance with an embodiment of the present invention.

In conclusion, sun shield 100 is configured to mount to a vehicle side-window 106, as illustrated in FIG. 1 and FIG. 8, illustrating an exterior view of sun shield 100 mounted to the side-window 106. Sun shield 100 serves to help block the ultra violet light 110 from the sun, so that the outer arm of the driver or passenger in a vehicle is protected. Sun shield 100 includes a flat lower portion panel 102 having two legs 200a-b that fit into the slot between the window and the rubber strip of the window. Sun shield 100 also includes a flat upper portion panel 104 integrally formed with the lower portion panel 102 at an angle of 15° (See FIG. 2). Though other angles may be formed by upper portion panel 104 to accommodate different side-window structures and arm sizes. Upper portion panel 104 extends towards the interior of the vehicle above the driver or passenger arm to block the sunlight. Lower portion panel 102 may be 24" long, and the upper portion panel 104 may extend out 5¼" over the arm of the driver or passenger. Film 206 overlays, and adheres to at least upper portion panel, and possible lower portion panel and legs. Film 206 is configured to substantially block ultraviolet light 110 of the sun.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A vehicle side-window sun shield, the sun shield comprising:
    a lower portion panel defined by a lower edge, an upper edge, and a pair of lateral edges;
    one or more legs integrally joined with the lower edge of the lower portion panel, the one or more legs terminating at a flat, tapered edge; and
    an upper portion panel integrally joined with the upper edge of the lower portion panel, the upper portion panel projecting at an angle relative to the lower portion panel.

2. The sun shield of claim 1, wherein the lower portion panel is flat.

3. The sun shield of claim 1, wherein the lower portion panel is defined by a rectangular shape.

4. The sun shield of claim 1, wherein the lower portion panel is about 24 inches long.

5. The sun shield of claim 1, wherein the one or more legs comprise two legs.

6. The sun shield of claim 1, wherein the one or more legs are defined by a rectangular shape.

7. The sun shield of claim 1, wherein the one or more legs are smaller than the lower portion panel and the upper portion panel.

8. The sun shield of claim 1, wherein the one or more legs are sized and dimensioned to fit into the slot between a vehicle side-window and a rubber strip.

9. The sun shield of claim 8, wherein the side-window is a driver's side-window.

10. The sun shield of claim 1, wherein the upper portion panel is flat.

11. The sun shield of claim 1, wherein the upper portion panel is defined by a rectangular shape.

12. The sun shield of claim 1, wherein the upper portion panel is about 24 inches long.

13. The sun shield of claim 1, wherein the upper portion panel is about 5¼ inches wide.

14. The sun shield of claim 1, wherein the upper portion panel is disposed at an angle of at least 45 degrees relative to the lower portion panel.

15. The sun shield of claim 1, further comprising a film configured to block at least 50 percent of the ultra violet light of the sun.

16. The sun shield of claim 15, wherein the film is translucent.

17. The sun shield of claim 15, wherein the film overlays the lower portion panel and the upper portion panel.

18. A vehicle side-window sun shield, the sun shield comprising:
- a flat lower portion panel defined by a lower edge, an upper edge, and a pair of lateral edges;
- one or more legs integrally joined with the lower edge of the lower portion panel, the one or more legs terminating at a flat, tapered edge;
- a flat upper portion panel integrally joined with the upper edge of the lower portion panel, the upper portion panel disposed at an angle of at least 45 degrees relative to the lower portion panel; and
- a film configured to block at least 50 percent of the ultra violet light of the sun.

19. The sun shield of claim 18, wherein the film overlays the lower portion panel and the upper portion panel.

20. A vehicle side-window sun shield, the sun shield comprising:
- a flat lower portion panel defined by a lower edge, an upper edge, and a pair of lateral edges;
- one or more legs integrally joined with the lower edge of the lower portion panel, the one or more legs terminating at a flat, tapered edge, the one or more legs being sized and dimensioned to fit into a slot between a vehicle side-window and a rubber strip;
- a flat upper portion panel integrally joined with the upper edge of the lower portion panel, the upper portion panel disposed at an angle of at least 45 degrees relative to the lower portion panel; and
- a film overlaying the lower portion panel and the upper portion panel, the film configured to block at least 50 percent of the ultra violet light of the sun.

* * * * *